US009003085B2

(12) United States Patent
Saugnac

(10) Patent No.: US 9,003,085 B2
(45) Date of Patent: Apr. 7, 2015

(54) AIRCRAFT COMMUNICATION SYSTEM COMPRISING AN AIRCRAFT TERMINAL AND A PORTABLE RESOURCE

(75) Inventor: Frederic Saugnac, Auzeville Tolosane (FR)

(73) Assignee: Airbus, Blagnac (FR)

( * ) Notice: Subject to any disclaimer, the term of this patent is extended or adjusted under 35 U.S.C. 154(b) by 0 days.

(21) Appl. No.: 12/532,847

(22) PCT Filed: Mar. 28, 2008

(86) PCT No.: PCT/FR2008/000428
§ 371 (c)(1),
(2), (4) Date: Sep. 24, 2009

(87) PCT Pub. No.: WO2008/142240
PCT Pub. Date: Nov. 27, 2008

(65) Prior Publication Data
US 2010/0106870 A1 Apr. 29, 2010

(30) Foreign Application Priority Data
Mar. 30, 2007 (FR) ...................................... 07 54189

(51) Int. Cl.
G06F 13/12 (2006.01)
G08G 5/00 (2006.01)
H04L 12/413 (2006.01)

(52) U.S. Cl.
CPC ............ *G08G 5/0021* (2013.01); *H04L 12/413* (2013.01)

(58) Field of Classification Search
USPC .................. 710/62, 63, 72–74; 701/3, 24, 36
See application file for complete search history.

(56) References Cited

U.S. PATENT DOCUMENTS

| 6,401,013 | B1 | 6/2002 | McElreath |
| 7,058,602 | B1* | 6/2006 | La Mura et al. ................ 705/37 |
| 8,122,101 | B2* | 2/2012 | Schulz et al. ................. 709/219 |
| 2003/0142089 | A1 | 7/2003 | Myers |
| 2005/0061336 | A1* | 3/2005 | Goetz et al. ................... 128/899 |
| 2006/0107295 | A1* | 5/2006 | Margis et al. ................... 725/81 |
| 2006/0282597 | A1* | 12/2006 | Plogmann ..................... 710/303 |
| 2007/0016344 | A1* | 1/2007 | Stefani ............................. 701/3 |
| 2007/0055416 | A1 | 3/2007 | Allen |
| 2007/0130437 | A1* | 6/2007 | Larson et al. ................. 711/165 |

FOREIGN PATENT DOCUMENTS

EP 1 726 918 11/2006

OTHER PUBLICATIONS

Fitzsimmons, Fredric "The Electronic Flight Bag: A Multi-Function Tool for the Modern Cockpit", Institute for Information Technology Applications United States Air Force Academy, pp. I-V and 1-60, XP002436744, Aug. 2002.
Richardson et al., "Virtual Network Computing", IEEE Internet Computing, vol. 2, No. 1, pp. 33-38, XP002142727, Jan. 1998.

* cited by examiner

*Primary Examiner* — Chun-Kuan Lee
*Assistant Examiner* — David Martinez
(74) *Attorney, Agent, or Firm* — Oblon, McClelland, Maier & Neustadt, L.L.P.

(57) ABSTRACT

An aircraft communication system including an aircraft terminal connected to at least one input/output unit. The system includes a portable resource connected to the aircraft terminal via a network connection. The at least one input/output unit is configured to interact with the unit formed by the aircraft terminal and the portable resource.

20 Claims, 5 Drawing Sheets

AIRCRAFT COMMUNICATION SYSTEM COMPRISING AN AIRCRAFT TERMINAL AND A PORTABLE RESOURCE

BACKGROUND OF THE INVENTION

The present invention relates to an aircraft communication system, especially in an aircraft, comprising an aircraft terminal and a portable resource, and to an associated aircraft terminal and portable resource.

Airplane pilots wish to be able to use their portable computer, their data or applications not only in the airplane during the different phases of flight but also on the ground for their training or for updates of flight data just before the flight.

In an airplane, therefore, the crew, especially the pilot, is able to use applications installed on the on-board terminal (which traditionally is equipment in the cockpit) or on its portable computer. These can be connected to the resources of the airplane, especially to a screen and a keyboard in the cockpit, to a power supply and the airplane data-transmission bus via a universal connector or a specific hardware connector.

Nevertheless, this solution has a certain number of disadvantages. In fact, this connector must function for every type of resource to be connected to the airplane, especially the on-board terminal, the portable computer of the pilot and more particularly the airplane data-transmission bus. In addition, this solution may pose problems of data security.

In addition, this connector must be installed by all manufacturers of resources (especially the manufacturers of computers, portable computers).

Furthermore, this solution has the disadvantage that the connector must be standardized.

According to another approach, a receiving station ("docking station" in English terminology) capable of accommodating a portable computer is installed in the cockpit of the airplane. This docking station is a physical connector connected to input/output means that form an interface with the pilot, in the cockpit. In addition, the docking station is connected via a connection to replaceable functional units LRU ("Line Replaceable Units" in English terminology), this connection being in particular, for example, an ARINC 429 bus.

Nevertheless, according to this approach, it must be noted that the docking station is capable of receiving only a single portable computer model. In fact, a specific docking station is necessary for each brand of computer and sometimes for different types of computers.

According to an approach illustrated in FIG. 1, a generic docking station 10 is fixed in the cockpit of the airplane in order to overcome this disadvantage. Then, for each model of portable computer used by the pilots, there is manufactured an adapter 12 capable of receiving portable computer 11 and capable of being inserted into the docking station installed in the cockpit.

Nevertheless, this solution has the disadvantage that adapters must be developed for the different portable computers used by the pilots.

SUMMARY OF THE INVENTION

A first object of the present invention is to remedy at least one of the disadvantages of the aforesaid prior art techniques and processes. For this purpose, the invention proposes in particular a communication system that makes it possible to use a remote portable resource and that has the advantage in particular that a user can use the terminal present in an equipment item as well as his portable resource. The equipment item is, for example, included in an aircraft.

Another object of the invention is to take advantage of an existing terminal installed on board the aircraft to favor interactivity with the portable resource as well as the security of the networking assembly.

The object of the invention is therefore an aircraft communication system comprising an aircraft terminal connected to at least one input/output unit, the system comprising a portable resource connected to the aircraft terminal by a network connection, the said at least one input/output unit being capable of interacting with the assembly formed by the aircraft terminal and the portable resource, characterized in that the aircraft terminal is capable of accessing at least one memory unit of the portable resource and comprises execution means capable of executing at least one application stored in memory in the memory unit of the portable resource.

The system according to the invention therefore makes it possible to use a portable resource via an aircraft terminal by using input/output units connected to the aircraft terminal, especially the keyboard and/or the designation system (for example, the pointing equipment, the mouse), the portable resource and the aircraft terminal being connected, for example, by an Ethernet connection or by a USB connection.

In this way it becomes possible to use any kind of portable resource connected to the aircraft terminal as well as the aircraft terminal, without necessitating any physical adaptation for use of the portable resource.

In addition, via commands originating from the input/output unit, such as the keyboard connected to the aircraft terminal, the aircraft terminal makes it possible to execute an application stored in memory and installed in the portable resource by using its processing resources, especially its execution unit.

According to this arrangement of the invention, the relationship between the aircraft terminal and the portable resource is optimized by minimizing the use of the link between the two. Thus networking security is enhanced while the interactivity with the application being executed is strong.

According to a particular embodiment, the portable resource is a portable computer.

According to another embodiment, the portable resource is a memory device.

In particular, the memory device comprises an operating system.

The invention also relates to an aircraft comprising an aircraft communication system according to the invention.

The aircraft has the same advantages as the aircraft communication system described briefly hereinabove, and therefore they will not be recalled here.

The invention is also aimed at an aircraft terminal connected to at least one input/output unit, comprising a network connection means capable of connecting a portable resource, the said at least one input/output unit being capable of interacting with the assembly formed by the aircraft terminal and the portable resource, characterized in that the aircraft terminal comprises access means capable of accessing at least one memory unit of the portable resource and comprises execution means capable of executing at least one application stored in memory in the memory unit of the portable resource.

Likewise the invention proposes a portable resource, characterized in that it comprises a network connection means capable of being connected to an aircraft terminal comprising at least one input/output unit, the said at least one input/output unit being capable of interacting with the assembly formed by the aircraft terminal and the portable resource.

The terminal and the portable resource have the same advantages as the aircraft communication system described briefly hereinabove, and therefore they will not be recalled here.

BRIEF DESCRIPTION OF THE DRAWINGS

Other advantages, objectives and characteristics of the present invention become apparent from the detailed description hereinafter, provided by way of non-limitative example, with regard to the attached drawings, wherein.

DETAILED DESCRIPTION OF THE INVENTION

According to the invention, a given portable resource such as, for example, a portable computer or a portable memory medium, can be used in an equipment item, especially in an airplane, and outside the equipment item. In fact, in an airplane, the crew, especially the pilot, can use applications installed either on the on-board terminal, also known as aircraft terminal, or on a portable resource, such as their portable computers or their portable memory media. For this purpose, the portable resource is connected in particular to the on-board terminal, in such a way that this portable resource is remotely accessible. The on-board terminal is additionally connected to a bus, especially to the ARINC 429 or Ethernet bus of the avionic network of the airplane, in such a way as to have access to the airplane data, and to an input/output unit, such as a display unit and a keyboard positioned in the cockpit of the airplane. During flight, therefore, the portable resource is fixed in the cockpit of the airplane, for example, and is connected to the resources of the airplane. Thus the on-board crew, especially the pilot, are capable of using the applications and the data contained in this portable resource via the on-board terminal during all phases of flight. On the ground, the pilot is also capable of using the applications and the data of the portable resource.

Thus, for this purpose, the system according to the invention is based on a remote portable resource connected to the on-board terminal by a network connection, especially an Ethernet connection or a USB connection. The applications or the data contained in the remote portable resource are used via the on-board terminal of the airplane, especially by using a non-central display technology based, for example, on a client-server architecture.

The on-board terminal and the keyboard form in particular the on-board information terminal OIT ("Onboard Information Terminal" in English terminology) of the airplane.

It is to be noted that an Ethernet connection and a USB connection use existing standard connectors.

In addition, according to the invention, the remote portable resource can be installed in an existing rack that needs only minor adaptations. In fact, it may be necessary to fasten the portable resource, in particular by means of foam padding and straps.

The remote portable resource may use a defined software interface SIS ("System Interface Specification" in English terminology), in such a way that every application conforming with this interface may be integrated.

This software interface permits applications to be used on the basis of the structure installed in the airplane.

Another software interface also permits the collected airplane data concerning the airplane to be made available to applications installed on the remote portable resource.

Figure 1:
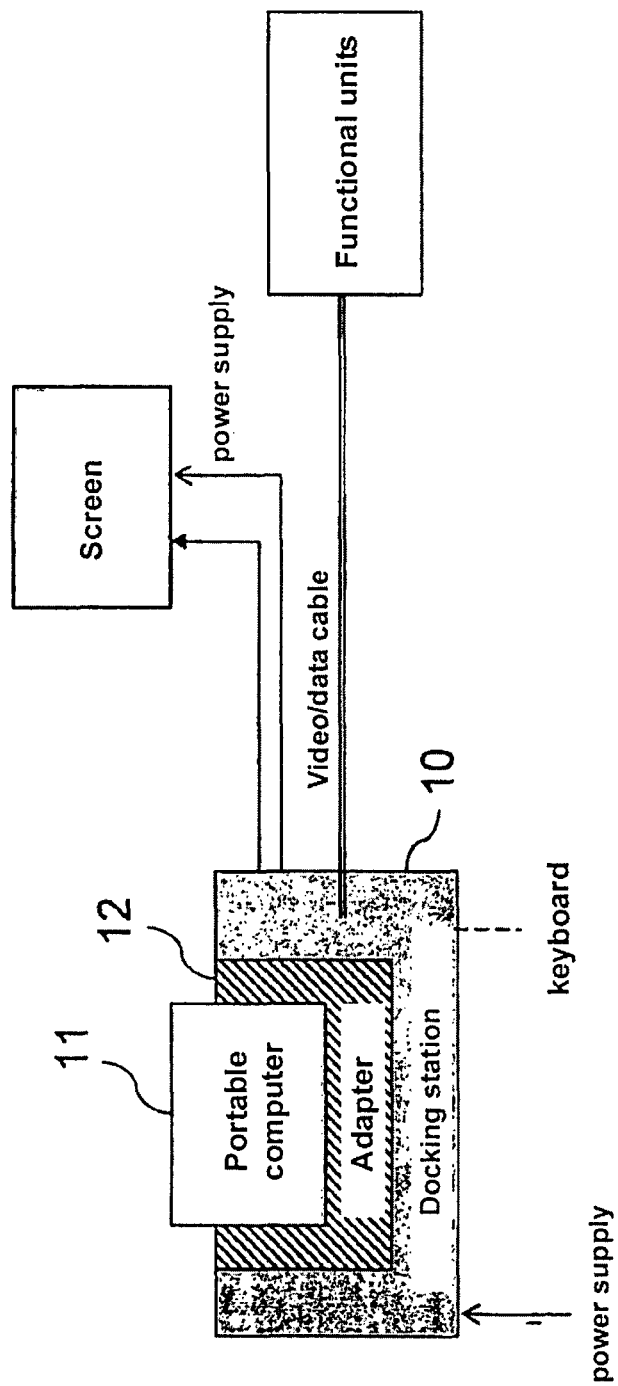
FIG. 1 shows a docking station of a portable computer with adapter.
Figure 2:
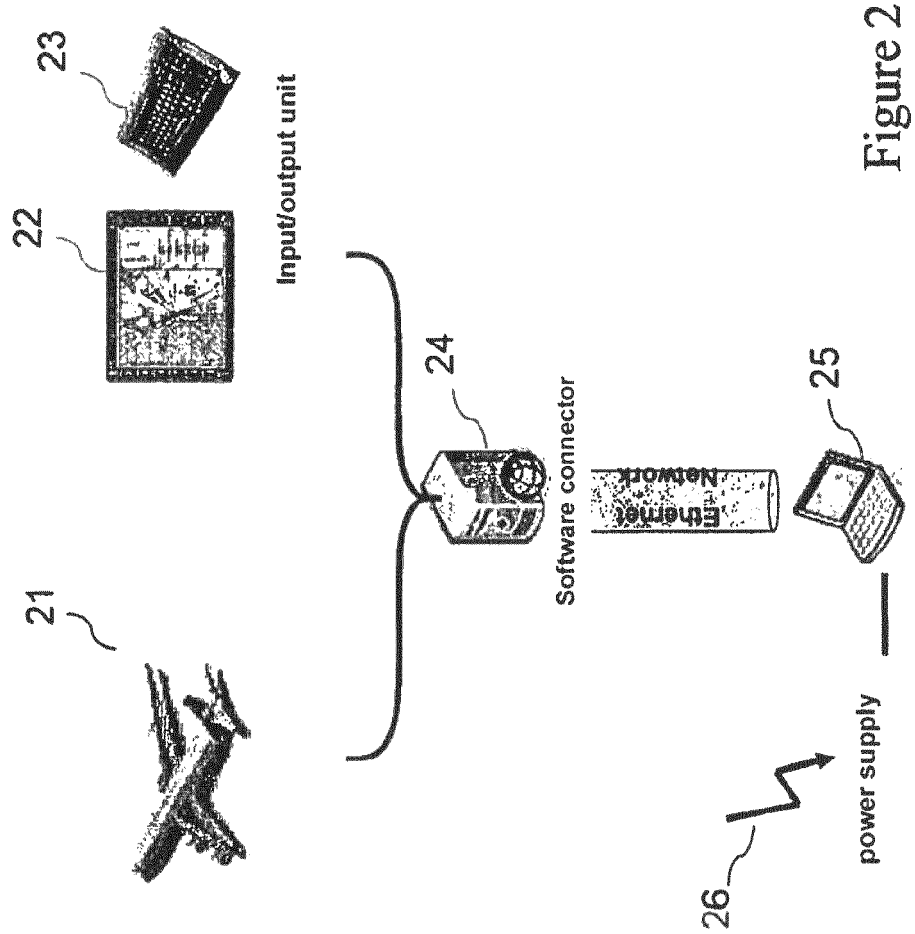
FIG. 2 illustrates a system for communication between an on-board terminal and a remote portable resource according to the invention.

Referring now to FIG. 2 there is described an embodiment of a system for communicating in an airplane between an on-board terminal and a remote portable resource according to the invention.

According to this embodiment, on the one hand the different elements of airplane 21, especially the data of the airplane and the connectivity of the airplane, and on the other hand display unit 22 and keyboard 23 are connected to an on-board terminal 24 capable of acting as a connector, especially a software connector, in view of connection thereof with a remote portable resource 25 powered by means of a power supply outlet 26.

The remote portable resource is in particular a portable computer, a storage unit such as a hard disk, a flash memory, a memory equipped with a simplified operating system such as a "bootable" USB key, meaning it is capable of being powered up, etc.

Via the network link, especially the Ethernet link, this connector permits the remote portable resource to access airplane data, discrete signals (such as the status of working documents (EFB)) and all available airplane services (USB port, for example), by establishing correspondence between ports ("port mapping" in English terminology).

Thus the applications concerning the working documents (EFB) are capable of being displayed on display unit 22.

Figure 3:
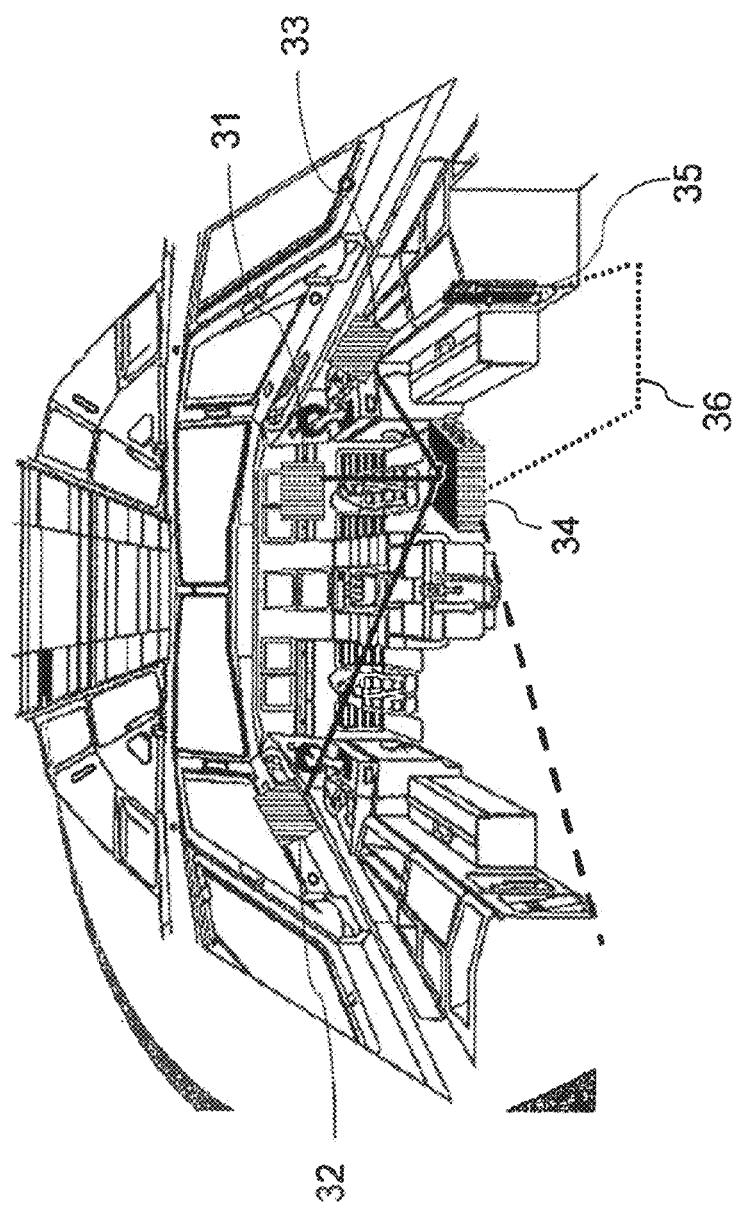
FIG. 3 illustrates a communication system in an airplane cockpit according to the invention.

FIG. 3 illustrates a physical installation of such a system in the cockpit of an airplane.

Thus different display units 31, 32, 33 are connected to on-board terminal 34, capable of acting as the software connector. The avionic network is, for example, connected to this on-board terminal by means of an ARINC 429 bus in order to receive the airplane data.

In addition, remote portable resource 35 is connected to on-board terminal 34 by means of a connection 36, especially an Ethernet connection.

According to a first particular embodiment, the remote portable resource is connected to the on-board terminal, and a virtual network computer is employed between the on-board terminal and the remote portable resource. According to the embodiment, the inputs/outputs of the remote portable resource are those of the airplane, or in other words the screens and keyboards of the cockpit of the airplane. This embodiment is known as distant display ("Remote display" in English terminology).

Different technological protocols for "virtual" network computer creations may be used, such as the computers of the VNC type ("Virtual Network Computing" in English terminology), or else servers of "MS terminal server" type.

Furthermore, since the on-board terminal and the remote portable resource are connected by technologies such as those of the client-server network type, the operating systems of the two resources are independent. In this way the operating systems running on the on-board terminal and on the remote portable resource may be different. For example, the remote portable resource may have an operating system of the Windows type (registered trademark) and the on-board terminal may have a different operating system, namely a system of Linux type.

According to a second particular embodiment, the remote portable resource, connected to the on-board terminal, makes a directory available so that the on-board terminal can execute applications locally by itself, the applications and/or the data being stored in memory on the remote portable resource. This embodiment is known as remote storage ("Remote Hard Disk" in English terminology).

Figure 4:
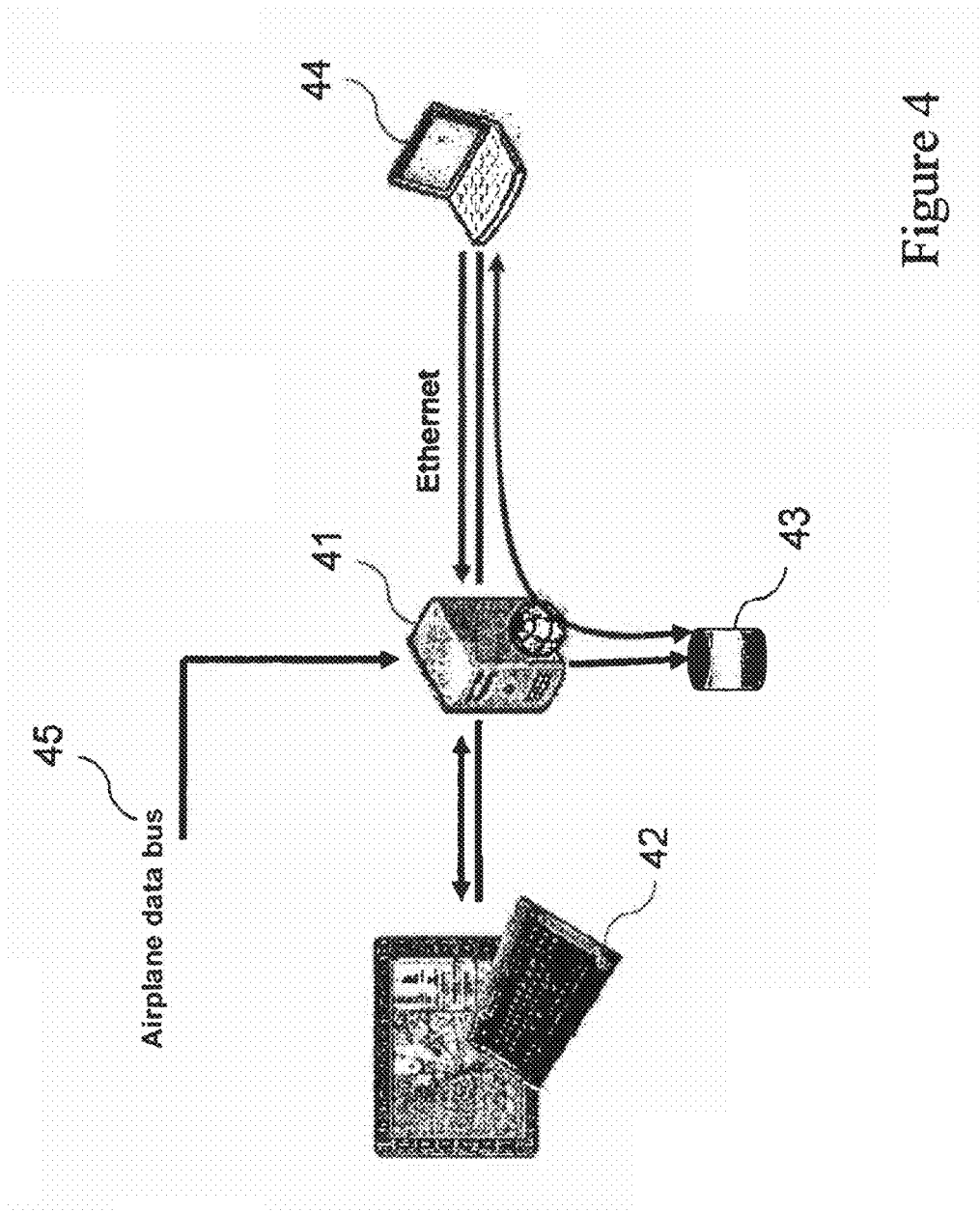
FIG. 4 illustrates a first mode of employment of the invention, or in other words the remote display.

FIG. 4 illustrates the first particular embodiment, namely the remote display.

There is shown an on-board terminal 41, to which there are connected at least one display unit and at least one keyboard 42 installed in the cockpit of the airplane.

A database 43 capable of storing the data of the airplane in memory is also connected to this on-board terminal.

In addition, according to the invention, a remote portable resource 44 is connected to on-board terminal 41 according to a client-server architecture, especially by means of an Ethernet connection.

In addition, a bus 45 transporting the airplane data, especially an ARINC 429 bus, can be connected to on-board terminal 41 by means of read-only and non-real-time connection. This connection permits the on-board terminal to collect items of information, especially about the operation of functional units of the airplane. These data are stored in memory in airplane database 43.

According to this embodiment, the remote portable resource is connected by means of an Ethernet connection to on-board terminal 41.

According to a particular embodiment, the remote portable resource is a server of the virtual network ("server VNC" in English terminology) and the on-board terminal is a client of the virtual network ("client VNC") in English terminology).

According to this embodiment, the users access the remote portable resource as if this resource were local. Also the processing unit being used, especially the processor, the physical memory, the mass-storage memory, is that of the remote portable resource.

Via on-board terminal 41, the application running on remote portable resource 44 uses the local resources of the airplane for the man-machine interface, especially the input/output unit, for example display unit 42 and the keyboard. For this purpose, the on-board terminal manages a display unit in such a way that this displays the application running on the remote portable resource.

The "remote display" embodiment described here solves the problem of mobility created by the use of the electronics of the airplane in the operations of an airplane, since mobility is indispensable for updates of data, for example before the departure of the airplane (weather, crew change). This need for mobility necessitates a portable system, available during all phases of flight, which accesses the avionic data, especially of read-only type, and which should be fixed in the airplane.

In addition, on-board terminal 41 comprises means for receiving data from unit 42, especially from the keyboard, and means for transmitting these data to the remote portable resource, and means for receiving data from the remote portable resource and means for transmitting these data to unit 42, especially the display.

For this purpose, the active input/output ports of the on-board terminal, especially of the input/output unit, are connected with the ports of the remote portable resource, especially by effecting addressing changes.

To employ this embodiment, there is installed in the on-board terminal and in the remote portable resource a software program, for example of Linux type, which acts respectively as client and server.

In addition, according to this architecture, the applications running on the remote portable resource are able to access airplane database 43.

In fact, access to the avionic parameters is achieved via the on-board terminal, then transferred to the applications of the remote portable resource by port mapping in the same way as for the screen or keyboard. For this purpose, a server application runs on the on-board terminal to deliver the avionic data to the remote portable resource.

Figure 5:
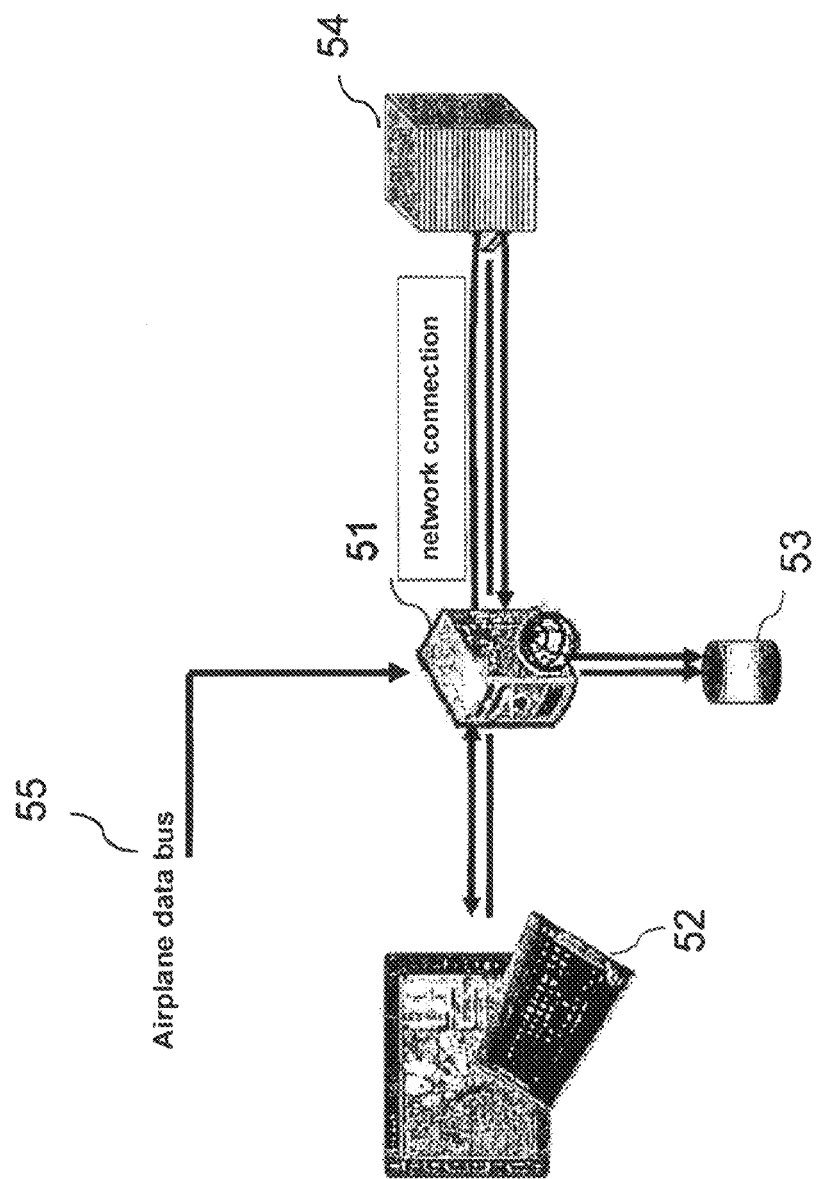
FIG. 5 illustrates a second mode of employment of the invention, or in other words the remote storage.

Referring now to FIG. 5 there is described the second particular embodiment, namely the remote storage.

There is shown an on-board terminal 51, to which there are connected at least one display unit and at least one keyboard 52 installed in the cockpit of the airplane.

A database 53 capable of storing the airplane data in memory is also connected to this on-board terminal.

In addition, according to the invention, a remote portable resource 54 is connected to on-board terminal 51, especially by means of an Ethernet connection.

In addition, a bus 55 transporting the airplane data, especially an ARINC 429 bus, can be connected to on-board terminal 51 by means of read-only and non-real-time connection. This connection permits the on-board terminal to collect items of information, especially about the operation of functional units of the airplane. These data are stored in memory in airplane database 53.

According to this architecture, remote portable resource 54 is a file server ("file server" in English terminology), where applications and data are stored in memory. For this purpose, the remote portable resource comprises at least one memory unit that forms a shared directory and means for making the shared directory available.

According to a particular embodiment, remote portable resource 54 is a portable computer that makes all or part of the storage memory contained in the portable computer available to on-board terminal 51.

According to another particular embodiment, remote portable resource 54 is a memory medium such as a hard disk or a flash memory.

In the remote storage embodiment, the applications installed on the shared directory of the remote portable resource are executed on the on-board terminal, especially by using the processor thereof. For this purpose, the on-board terminal comprises access means capable of accessing the shared directory of the remote portable resource.

Nevertheless, these applications are executed by the processing unit of on-board terminal 51, especially by the processor of the on-board terminal. The display of execution of the application stored in memory on the remote portable resource is also managed by the on-board terminal.

In addition, according to this architecture, on-board terminal 51 can access airplane database 53.

The invention claimed is:
1. An aircraft communication system comprising:
an aircraft terminal connected to at least one input/output unit and to an avionic network of an aircraft, each of the aircraft terminal and the at least one input/output unit being fixed within the aircraft; and
a portable resource, portable with respect to the aircraft, connected to the aircraft terminal by crew of the aircraft through a network connection, the portable resource including a portable computer,
wherein the aircraft terminal is connected between the portable resource and the at least one input/output unit, and the portable resource is connected to the at least one input/output unit through the aircraft terminal, wherein the at least one input/output unit is configured to interact with an assembly formed by the aircraft terminal and the portable resource, wherein the aircraft terminal is configured to access at least one memory unit of the portable resource, via a shared directory made available by the portable resource, to access at least one application and corresponding data currently stored in memory of the at least one memory unit for execution of the at least one application, and the aircraft terminal includes an execution processor configured to execute by itself the at least one application that is currently stored in the memory of the at least one memory unit of the portable resource, wherein the execution by the aircraft terminal of the at least one application, which is currently stored in the memory of the at least one memory unit of the portable resource, is performed based on a command originating from the at least one input/output unit, and wherein the portable resource is configured to be used by the crew directly and remotely via the at least one input/output unit by way of the aircraft terminal.

2. A system according to claim 1, wherein the network connection between the aircraft terminal and the portable resource is an Ethernet connection.

3. A system according to claim 2, wherein the portable resource includes a memory medium.

4. A system according to claim 2, wherein all or part of the memory in the portable computer is available to the aircraft terminal for storage.

5. A system according to claim 1, wherein the network connection between the aircraft terminal and the portable resource is a Universal Serial Bus (USB) connection.

6. A system according to claim 5, wherein the portable resource includes a memory medium.

7. A system according to claim 1, wherein the portable resource includes a memory medium.

8. An aircraft comprising an aircraft communication system according to claim 1.

9. A system according to claim 1, wherein respective operating systems running on the aircraft terminal and on the portable resource are different.

10. A system according to claim 1, wherein all of the memory in the portable computer is available to the aircraft terminal for storage.

11. A system according to claim 1, wherein all or part of the memory in the portable computer is available to the aircraft terminal for storage.

12. A system according to claim 1, wherein the aircraft terminal is integral with and fixedly arranged in a cockpit of said aircraft.

13. A system according to claim 1, wherein the aircraft terminal, the at least one input/output unit, and the connection of the portable resource to the aircraft terminal are physically in a cockpit of the aircraft and physically accessible by at least one of the pilots of the aircraft.

14. A system according to claim 1, wherein information items regarding operation of one or more functional units of the aircraft are sent to the portable resource in read-only access format for use during execution of said at least one application.

15. A system according to claim 1, wherein information items regarding operation of one or more functional units of the aircraft, from an aircraft-specific bus, are usable with said at least one application during execution of said at least one application.

16. A system according to claim 1, further comprising an aircraft database connected to the aircraft terminal that stores data of the aircraft, the aircraft data including operation information regarding functional elements of the aircraft, and the aircraft terminal being configured to access the aircraft data including operation information regarding functional elements of the aircraft for use of the aircraft data with the executing of the at least one application.

17. A system according to claim 1, wherein at least one application and corresponding data are accessible, via the aircraft terminal and the at least one input/output unit, during all phases of a flight of the aircraft and when the aircraft is on the ground.

18. A system according to claim 1, wherein the portable resource is configured to directly access the at least one application, when the at least one application is executing, at the same time at which the aircraft terminal accesses the executing at least one application.

19. An aircraft terminal connected to at least one input/output unit and to an avionic network of an aircraft, comprising:

a network connection for connecting thereto, by crew of the aircraft, a portable computer, the at least one input/output unit being configured to interact with an assembly formed by the aircraft terminal and the portable computer, and the portable computer being portable with respect to the aircraft, wherein the aircraft terminal is connected between the portable computer and the at least one input/output unit, and the portable computer is connected to the at least one input/output unit through the aircraft terminal, wherein the aircraft terminal is configured to access at least one memory unit of the portable computer, via a shared directory made available by the portable computer, to access at least one application and corresponding data currently stored in memory of the at least one memory unit for execution of the at least one application, and the aircraft terminal includes an execution processor configured to execute by itself the at least one application that is currently stored in the memory of the memory unit of the portable computer, wherein each of the aircraft terminal and the at least one input/output unit is fixed within the aircraft, and wherein the execution by the aircraft terminal of the at least one application, which is currently stored in the memory of the at least one memory unit of the portable computer, is performed based on at least one command originating from the at least one input/output unit, and wherein the portable computer is configured to be used by the crew directly and remotely via the at least one input/output unit by way of the aircraft terminal.

20. A method for communicating in an aircraft including an aircraft terminal connected to at least one input/output unit and to an avionic network of the aircraft, each of the aircraft terminal and the at least one input/output unit being fixed within the aircraft, and the method comprising:

connecting a portable computer, portable with respect to the aircraft, to the aircraft terminal by crew of the aircraft using a network connection;

interacting with an assembly formed by the aircraft terminal and the portable computer, using the input/output unit by a user to input a command to execute at least one application;

accessing at least one memory unit of the portable computer, via a shared directory made available by the portable computer, to access the at least one application and corresponding data currently stored in memory of the at least one memory unit for execution of the at least one application; and via commands originating based on the user's input command at the input/output unit, executing the at least one application that is currently stored in the memory of memory unit of the portable computer, using an execution processor of the aircraft terminal by itself, wherein the aircraft terminal is connected between the portable computer and the at least one input/output unit, and said connecting the portable computer connects the portable computer to the at least one input/output unit through the aircraft terminal, and wherein the portable computer is configured to be used by the crew directly and remotely via the at least one input/output unit by way of the aircraft terminal.

\* \* \* \* \*